United States Patent

Koike et al.

[11] Patent Number: 5,965,991
[45] Date of Patent: Oct. 12, 1999

[54] CONTROL SYSTEM FOR A VEHICLE-MOUNTED BATTERY

[75] Inventors: Tetsuo Koike, Hachiouji; Atsushi Masuda, Kiyose, both of Japan

[73] Assignee: Hino Jidosha Kogyo Kabushiki Kaisha, Tokyo, Japan

[21] Appl. No.: 09/022,632

[22] Filed: Feb. 12, 1998

Related U.S. Application Data

[63] Continuation of application No. PCT/JP97/01978, Jun. 10, 1997.

[30] Foreign Application Priority Data

Jun. 14, 1996 [JP] Japan .................................. 8-154359

[51] Int. Cl.$^6$ ........................................................ H02P 1/00
[52] U.S. Cl. ........................... 318/139; 318/800; 318/801
[58] Field of Search ..................................... 318/139, 801, 318/802, 35, 49; 320/149, 156, 138, 106, 136, 152; 180/65.6, 65.4; 324/427; 379/93.25; 355/219

[56] References Cited

U.S. PATENT DOCUMENTS

| | | | |
|---|---|---|---|
| 5,289,890 | 3/1994 | Toyoda et al. | 180/65.8 |
| 5,402,046 | 3/1995 | Jeanneret | 318/139 |
| 5,532,671 | 7/1996 | Bachman et al. | 340/438 |
| 5,586,613 | 12/1996 | Ehsani | 180/65.2 |
| 5,614,809 | 3/1997 | Kiuchi et al. | 322/11 |
| 5,650,713 | 7/1997 | Takeuchi et al. | 322/16 |
| 5,677,604 | 10/1997 | Masaki et al. | 318/139 |
| 5,703,469 | 12/1997 | Kinoshita | 320/48 |
| 5,730,238 | 3/1998 | Tamaki et al. | 180/65.8 |

FOREIGN PATENT DOCUMENTS

| | | |
|---|---|---|
| 3-203501 | 9/1991 | Japan . |
| 6-261411 | 9/1994 | Japan . |
| 7-274306 | 10/1995 | Japan . |

*Primary Examiner*—William M. Shoop, Jr.
*Assistant Examiner*—Ria Leykin
*Attorney, Agent, or Firm*—Pillsbury Madison & Sutro LLP

[57] ABSTRACT

A control system for a vehicle-mounted battery which, in accordance with the state of a battery, can make a polyphase alternating current rotating machine in a hybrid car assist the driving gear (the internal combustion engine) or charge the battery. The current and voltage during discharge and charging of a battery mounted on a vehicle are measured, and on the basis of this measured current and voltage information, a program control circuit controls the discharge current when an auxiliary driving force is given to the driving gear. This control is performed via an inverter which performs AC-to-DC or DC-to-AC conversion between the battery and the polyphase alternating current rotating machine coupled to the driving gear of the vehicle. Because the charging and discharging currents are limited in accordance with the state of charging of the battery, it is possible to avoid charging and discharging uniformly irrespective of the amount of charging of the battery. In addition, charging efficiency can be increased and the working life of the battery lengthened.

3 Claims, 7 Drawing Sheets

CONTROL SYSTEM FOR A VEHICLE-MOUNTED BATTERY

This is a Continuation of International Appln. No. PCT/JP97/01978 filed Jun. 10,1997 which designated the U.S.

TECHNICAL FIELD

The present invention is utilized for an electric vehicle which uses an electric motor for driving power. It relates to controlling the charging and discharging of a rechargeable vehicle-mounted battery. Although the present invention was developed for a hybrid car which makes combined use of an internal combustion engine and an electric motor for driving power, it can be widely utilized in vehicles in which a rechargeable battery is mounted and which utilize the energy of this battery for running.

BACKGROUND ART

The present applicant developed, and now manufactures and sells, a hybrid car called the HIMR which makes combined use of an internal combustion engine and an electric motor. In this vehicle, a three-phase alternating current squirrel-cage induction machine is coupled to the crankshaft of an internal combustion engine, a large battery is mounted on the vehicle, a bidirectional inverter is coupled between this battery and alternating current induction machine, and this inverter is controlled by a program control circuit (see WO88/06107).

With this system, when the vehicle accelerates, the rotating magnetic field applied to the alternating current induction machine is controlled so that the alternating current induction machine constitutes an electric motor, and when the vehicle decelerates, the rotating magnetic field applied to the alternating current induction machine is controlled so that the alternating current induction machine constitutes a generator. The control performed by this system is such that the battery discharges when the alternating current induction machine is utilized as an electric motor, and the battery charges when it is utilized as a generator. In other words, this system is controlled to provide regenerative braking.

This system has been mounted on large buses and has been applied to buses on urban routes and to buses operating in regions where it is essential to keep pollution extremely low. In recent years, pollution from the exhaust of vehicles with internal combustion engines has become a major problem, and this has led to discussion of the possibility that most vehicles being run in urban areas will become electric vehicles, despite the higher price of such vehicles and the fact that their fuel is quite expensive.

The HIMR described above is arranged to provide a battery compartment in the vehicle, to use batteries with a terminal voltage of 12 V as unit cells, such batteries being mass produced and therefore inexpensive to procure, and to mount twenty-five of these in the battery compartment and connect them electrically in series to give an overall terminal voltage of 12 V×25=300 V. This arrangement is utilized as a battery for supplying energy for running the vehicle.

The term "unit cell" here signifies the unit which, when a multiplicity are connected in series, comprises the battery for supplying energy to run the vehicle. For example, although in the case of a lead storage battery the chemical properties dictate that the terminal voltage of the smallest unit cell is 2 V, a commercial battery generally comprises a plurality of these 2 V cells connected in series and housed in one casing. For example, in the case of a lead storage battery, the terminal voltage of the unit cell can be 2 V, 4 V, 6 V, 12 V, 24 V and so forth. For other kinds of battery, the terminal voltage of the unit cell is determined by the chemical properties of the cell and by the number of cells connected in series.

The present applicant has filed an International Patent Application (see PCT/JP96/00966 and WO96/32651) relating to the monitoring of unit cells.

This system has voltage detection circuits which detect when the voltage between the positive terminal and the negative terminal of a multiplicity n (for example, 25) of unit cells connected in series by connection cables is less than a preset value. These voltage detection circuits comprise a first light-emitting display circuit which indicates by emitting red light when the voltage between the positive terminal and the negative terminal is less than a first preset value ($V_1$), as an indication that charging is required, and a second light-emitting display circuit which indicates by emitting green light when the voltage between the positive terminal and the negative terminal exceeds a second preset value ($V_2$), as an indication that the unit cell is charged. These light-emitting displays of the voltage detection circuits serve to give notification of the state of charging of the unit cells, i.e., of whether the unit cells are poorly charged or well charged.

The present inventor has been able to obtain a large number of records relating to the running and maintenance of the aforementioned HIMR vehicles. Because batteries gradually deteriorate with repeated charging and discharging, they have to be replaced after a certain time. However, in the prior art battery life was not taken into consideration in the control of charging and discharging. In other words, hitherto charging and discharging control of the battery of an electric vehicle has been performed in accordance with the running conditions of the vehicle, but without communicating the present state of the battery to the control system and taking this battery state into consideration.

This will now be explained in greater detail. If it is supposed for example that the standard terminal voltage of the battery is 300 V as described above, then there is a danger of damage to the battery if its terminal voltage exceeds a prescribed limit (e.g., 380 V) when charging by regenerative braking. Hitherto, therefore, control has been performed to ensure that this limit is not exceeded. However, this limit is actually a safe value for when the battery is well charged, whereas if a battery is in good condition (when it has not deteriorated and is not well charged), it could be efficiently charged at an even higher terminal voltage. This means that with a new battery which is not well charged, when the brake pedal is depressed and the vehicle is being braked, the amount of energy which ends up being dissipated as frictional heat of the brake shoes can be reduced, and more energy can be utilized for recharging the battery by regenerative braking.

In a hybrid vehicle, similar considerations apply when the accelerator pedal is depressed and the vehicle is accelerating. Namely, during acceleration the required torque is provided jointly by the internal combustion engine and the electric motor, but pollution can be reduced by applying control such that, at a given amount of accelerator pedal displacement (i.e., for a given torque), if the battery is in good condition (when it has not deteriorated and is well charged), the discharge current is increased and the burden on the internal combustion engine is reduced. If the battery is not well charged (when its deterioration has advanced or it is poorly charged), it is anticipated that the burden on the battery can be reduced and the burden on the internal combustion engine increased.

More detailed observations have shown that if for example twenty-five unit cells are discharged when connected in series, energy is not released uniformly from all twenty-five unit cells. Furthermore, when charging series-connected unit cells, not all the cells are charged uniformly. This is easily understood in terms of electrical characteristics by assuming that the internal resistance (R) of the individual unit cells is not equal. Because the unit cells are connected in series, the current (I) will be equal, but during charging and discharging the charging or discharging energy per unit time ($I^2R$) will not be equal. A unit cell with a higher internal resistance will have a higher terminal voltage during charging than other unit cells, and conversely will have a lower terminal voltage during discharge than other unit cells. Even assuming that the terminal voltages are actually equal, if all the unit cells are repeatedly charged and discharged at a standard or rated voltage, a cell with a high internal resistance will end up being overcharged during charging, with the result that this unit cell alone will undergo accelerated deterioration. Furthermore, despite being charged and discharged on the basis of series connection, a unit cell with a high internal resistance will acquire an elevated cell temperature, with the result that its characteristics will differ from those of other unit cells, and again this unit cell alone will end up deteriorating before other unit cells.

In other words, it has been discovered that an important factor for extending battery life is to determine the maximum value for the charging current or the maximum value for the discharge current not just in accordance with the state of the overall battery but also in accordance with the state of individual unit cells.

The inventor has carried out various trials such as housing unit cells from the same production lot in one battery compartment. It was discovered that even if the characteristics of the unit cells in a new vehicle are uniform, when the vehicle has been used for a long period of time these characteristics exhibit variability, and non-uniform deterioration accelerates. In general it is not individual unit cells of a battery which are replaced, but rather all the unit cells are replaced simultaneously. It is therefore evident that employing uniform conditions in the control of an entire battery is a cause of shortened battery life. Moreover, the use and subsequent disposal of large numbers of batteries will constitute a new source of pollution.

Against such a background, it is an object of the present invention to provide a system capable of observing the state of charging and discharging of a battery, and of assisting the driving gear and charging the battery in accordance with this state. It is another object of the present invention to perform control of charging and discharging which is suited to the battery, not just according to the state of charging of the battery, or in other words not just according to whether the battery is poorly charged or well charged, but also in accordance with whether the battery is new or is in a state of advanced deterioration. It is a further object of the present invention to improve battery charging and discharging efficiency and to lengthen the working life of a battery. It is yet another object of the present invention to reduce the amount of energy lost by the brakes and to regenerate as much energy as possible. It is a further object of the present invention to provide a control system such that even when there is variability in the characteristics of the unit cells, this variability is not made larger by long-term use. It is another object of the present invention to decrease battery costs for electric vehicles. It is still another object of the present invention to simplify battery maintenance.

DISCLOSURE OF INVENTION

The present invention is characterized in that it sets a boundary line in accordance with the state of deterioration of a battery, said boundary line demarcating the region in which the polyphase alternating current rotating machine in a hybrid car assists the driving gear. Here, the "state of deterioration of the battery" is decided not just according to whether the battery is poorly charged or well charged, but also according to whether the battery is new or has considerably deteriorated.

Namely, a first aspect of the present invention relates to control of the discharge current of a battery, and is characterized in that it comprises a polyphase alternating current rotating machine coupled to the driving gear of a vehicle, an inverter provided between this polyphase alternating current rotating machine and a battery mounted on the vehicle, said inverter performing AC-to-DC or DC-to-AC conversion, and a program control circuit for controlling this inverter, and also comprises means for measuring the current and voltage during discharge and/or the current and voltage during charging of the battery, and the program control circuit comprises means for controlling, via the inverter and on the basis of the voltage and current information measured by the aforesaid means, the discharge current of the battery.

The program control circuit preferably comprises: a memory in which discharge volt-ampere characteristics and/or charging volt-ampere characteristics have been stored in advance as a mapping in correspondence with the degree of battery deterioration; means which identifies the degree of battery deterioration by comparing the discharge or charging volt-ampere characteristics measured by the measuring means with the mapping stored in the memory; and means which acquires the amount of depression of the accelerator pedal and adjusts the magnitude of the discharge current in accordance with the degree of deterioration identified by the aforesaid identifying means, said discharge current serving to generate a driving torque corresponding to the amount of depression of the accelerator pedal.

The current and voltage of a battery continually change during discharge and charging. This discharge and/or charging current and voltage are constantly measured, and the program control circuit controls the inverter on the basis of this measured voltage and current information. Under this control the inverter performs DC-to-AC conversion between the battery and the polyphase alternating current rotating machine, and gives a driving force to the driving gear which is coupled to the polyphase alternating current rotating machine.

The degree of deterioration of the battery can be found by monitoring the terminal voltage and the volt-ampere characteristics of the discharge current or charging current. As shown on the right-hand side of FIG. 5, which gives an example of terminal voltage and discharge current characteristics, the volt-ampere characteristics change from $S_{10}$ to $S_{13}$ in accordance with the degree of deterioration. If the voltage at which charging is required has been set to a first preset value $V_1$ and the battery is new, the discharge characteristic will be $S_{10}$ and therefore the discharge current will be $I_{10}$. As opposed to this, the discharge characteristic when deterioration is advanced and replacement will soon be required is $S_{13}$. The discharge current at this time will be $I_{13}$ ($I_{13} < I_{10}$). These volt-ampere characteristics have been stored in advance in the memory and it is therefore possible to use actually measured volt-ampere characteristics to perform control suited to the state of the battery. In other words, control of this sort is not control simply on the basis of the state of charging of the battery, i.e., in accordance with whether the battery is well charged or poorly charged. Instead, it is control which also takes into consideration the degree to which battery deterioration has proceeded.

Further, in the relation between terminal voltage and charging current, as shown on the left-hand side of FIG. 5, the volt-ampere characteristic changes from $S_{20}$ to $S_{23}$ in accordance with the degree of battery deterioration. If the voltage at which charging is completed has been set to a second preset voltage $V_2$ and the battery is new and has no abnormality, the charging characteristic will be $S_{20}$ and the charging current will be $I_{20}$. However, when the state of the battery is such that replacement is required, as shown by the broken line, its discharge characteristic will be $S_{23}$ and the charging current will be $I_{23}(I_{23}<I_{20})$. Thus charging and discharging characteristics change according to the degree of deterioration, and at a given terminal voltage the discharge current and charging current decrease as deterioration proceeds.

By storing in advance such discharge and charging volt-ampere characteristics corresponding to degrees of battery deterioration, as a mapping in the memory of the program control circuit, and comparing measured discharge or charging current and voltage values with the mapping stored in the memory, the degree of deterioration of the battery is identified and the discharge current is controlled in accordance with this degree of deterioration.

Although discharge from the battery is carried out as a result of the accelerator pedal having been depressed, the program control circuit limits the discharge current, adjusting it in accordance with the degree of deterioration which has been identified by comparison between the mapping and the magnitude of the discharge current, said discharge current serving to generate a driving torque corresponding to the amount of depression of the accelerator pedal.

A second aspect of the present invention relates to control of the charging current of a battery, and is characterized in that it comprises a polyphase alternating current rotating machine coupled to the driving gear of a vehicle, an inverter provided between this polyphase alternating current rotating machine and a battery mounted on the vehicle, said inverter performing AC-to-DC or DC-to-AC conversion, and a program control circuit for controlling this inverter, and also comprises means for measuring the current and voltage during discharge and/or the current and voltage during charging of the battery, and the program control circuit comprises means for controlling, via the inverter and on the basis of the voltage and current information measured by the aforesaid means, the charging current of the battery.

The program control circuit preferably comprises: a memory in which discharge volt-ampere characteristics and/or charging volt-ampere characteristics have been stored in advance as a mapping in correspondence with the degree of battery deterioration; means which identifies the degree of battery deterioration by comparing the discharge or charging volt-ampere characteristics measured by the measuring means with the mapping stored in the memory; and means which acquires the brake pressure and adjusts the magnitude of the charging current in accordance with the degree of deterioration identified by the aforesaid identifying means, said charging current serving to generate a regenerative braking torque corresponding to the brake pressure.

The control of the charging current is performed in the same manner as the control of the discharge current. Namely, the charging current is controlled in accordance with the degree of deterioration, this having been identified by comparing the measured voltage and current information with the mapping stored in the memory.

Although charging of the battery is carried out as a result of the brake pedal having been depressed, or when engine braking is occurring, the program control circuit limits the charging current, adjusting it in accordance with the degree of deterioration which has been identified by acquiring the brake pressure and the associated engine rotation speed and by comparing the mapping with the magnitude of the charging current, said charging current serving to generate a regenerative braking torque corresponding to the brake pressure and engine rotation speed.

By controlling the charging and discharging current in this way, it is possible to assist the driving gear and to charge the battery in accordance with the state of the battery during this control, and to improve battery charging and discharging efficiency and lengthen the working life of the battery. It is also possible to regenerate more energy by minimizing the energy lost by the brakes, and even when there is variability in the characteristics of the unit cells, it is possible to prevent their variability from becoming larger due to long-term use.

A third aspect of the present invention is a recording medium on which the software required for a program control circuit of the sort described above is recorded. This software contains the aforementioned mapping and is installed in the program control circuit as part of the vehicle production process or as part of vehicle refitting. A recording medium of this sort is made a subject of the patent.

BEST MODE FOR CARRYING OUT THE INVENTION

Figure 1:
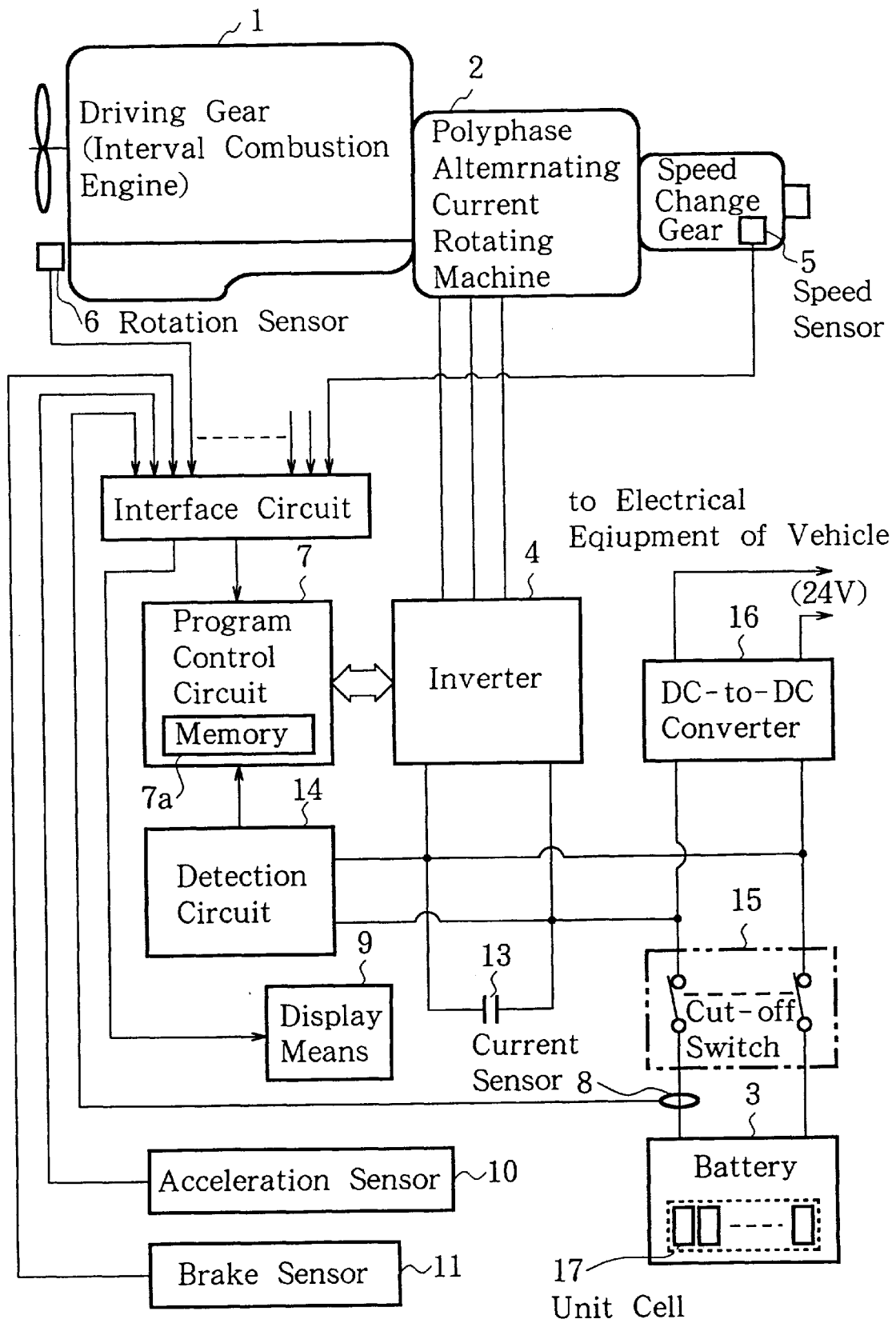
FIG. 1 is a block diagram showing the overall configuration of an embodiment of the present invention.

Next, an embodiment of the present invention will be explained with reference to the drawings. FIG. 1 is a block diagram showing the overall configuration of an embodiment of the present invention.

This embodiment of the present invention comprises: polyphase alternating current rotating machine 2 coupled to driving gear 1 (an internal combustion engine) of a vehicle; inverter 4 provided between this polyphase alternating current rotating machine 2 and battery 3 mounted on the vehicle, said inverter performing AC-to-DC or DC-to-AC conversion; speed sensor 5 for detecting the running speed of the vehicle; rotation sensor 6 for detecting the rotation speed of driving gear (internal combustion engine) 1; program control circuit 7 for controlling inverter 4 in accordance with the output of speed sensor 5 and rotation sensor 6; current sensor 8 for detecting the charging and discharging current of battery 3; display means 9 for displaying information relating to battery 3; acceleration sensor 10 for detecting the amount of depression of the accelerator pedal; and brake sensor 11 for detecting the operation of the brake pedal.

Speed sensor 5, rotation sensor 6, display means 9, acceleration sensor 10 and brake sensor 11 are connected to program control circuit 7 via interface circuit 12. Although omitted from FIG. 1, a gear position sensor, generator temperature sensor, clutch sensor and so forth are connected to this program control circuit 7.

Capacitor 13 is connected to the direct current side of inverter 4. Detection circuit 14 for detecting the output voltage of inverter 4 is connected to battery 3, as is DC-to-DC converter 16, which is connected via cut-off switch 15. Battery 3 comprises a multiplicity n of unit cells 17.

Means for measuring the current and voltage during discharge and the current and voltage during charging of battery 3 is also provided as a distinguishing feature of the present invention. Program control circuit 7 comprises: means for controlling, via inverter 4 and on the basis of the voltage and current information measured by the aforesaid measuring means, the discharge current of battery 3; memory 7a in which volt-ampere characteristics during discharging and during charging, or one or other of these volt-ampere characteristics, have been stored in advance as a mapping in correspondence with the degree of deterioration of battery 3; means for identifying the degree of battery deterioration by comparing the discharge or charging volt-ampere characteristics measured by the measuring means with the mapping stored in memory 7a; means which acquires the amount of depression of the accelerator pedal from acceleration sensor 10 and adjusts the magnitude of the discharge current in accordance with the degree of deterioration identified by the aforesaid identifying means, said discharge current serving to generate a driving torque corresponding to the amount of depression of the accelerator pedal; means for controlling, via inverter 4 and on the basis of the voltage and current information measured by the aforesaid means for measuring current and voltage, the charging current to battery 3; and means which acquires the brake pressure from brake sensor 11 and which adjusts the magnitude of the charging current in accordance with the degree of deterioration identified by the aforesaid identifying means, said charging current serving to generate a regenerative braking torque corresponding to the brake pressure.

Figure 2:
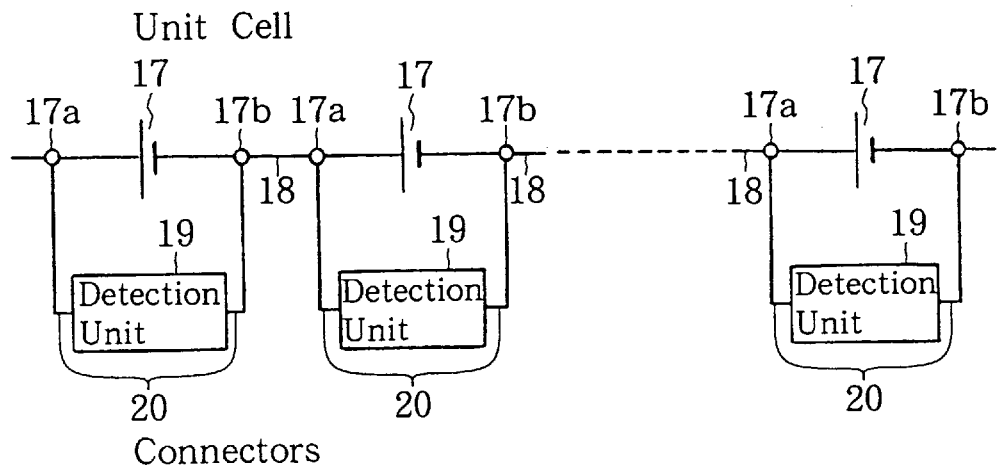
FIG. 2 is a block diagram showing the configuration of a high-voltage battery in an embodiment of the present invention.
Figure 3:
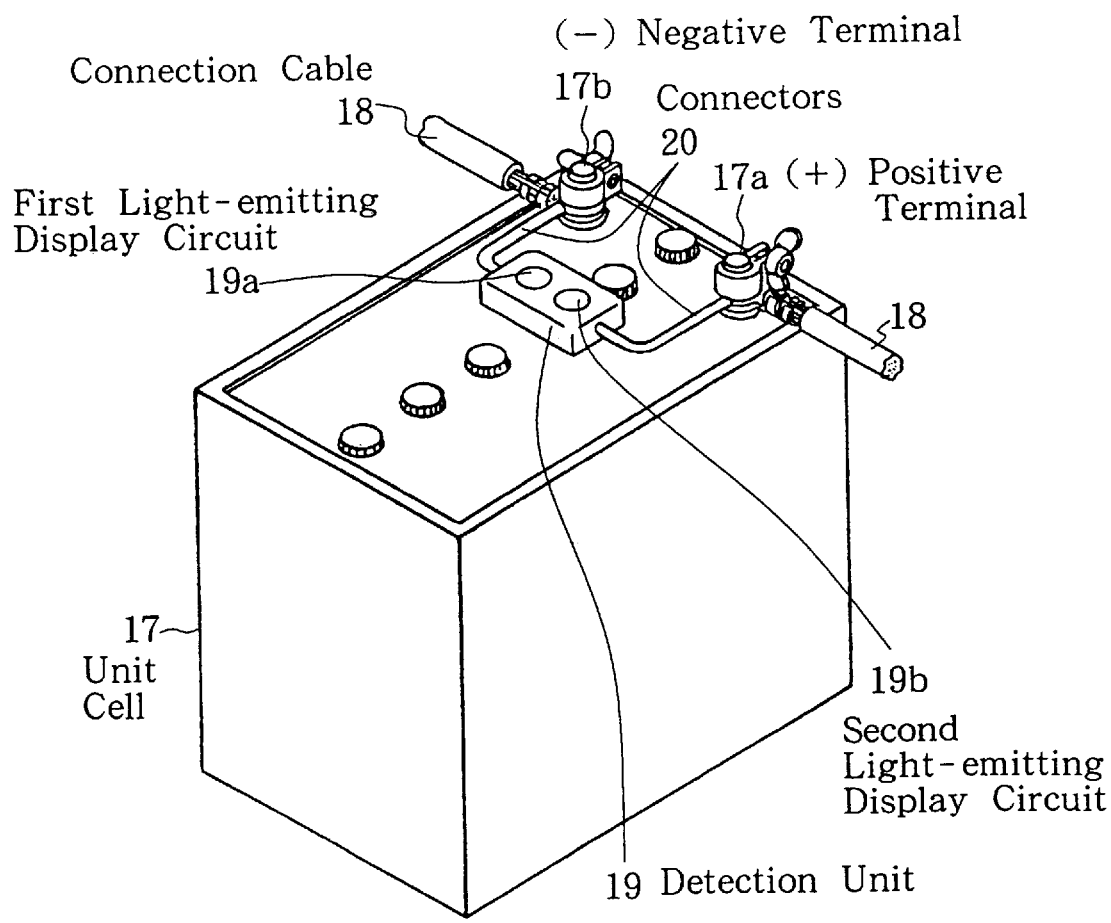
FIG. 3 is a perspective view showing the configuration of a unit cell in an embodiment of the present invention.
Figure 4:
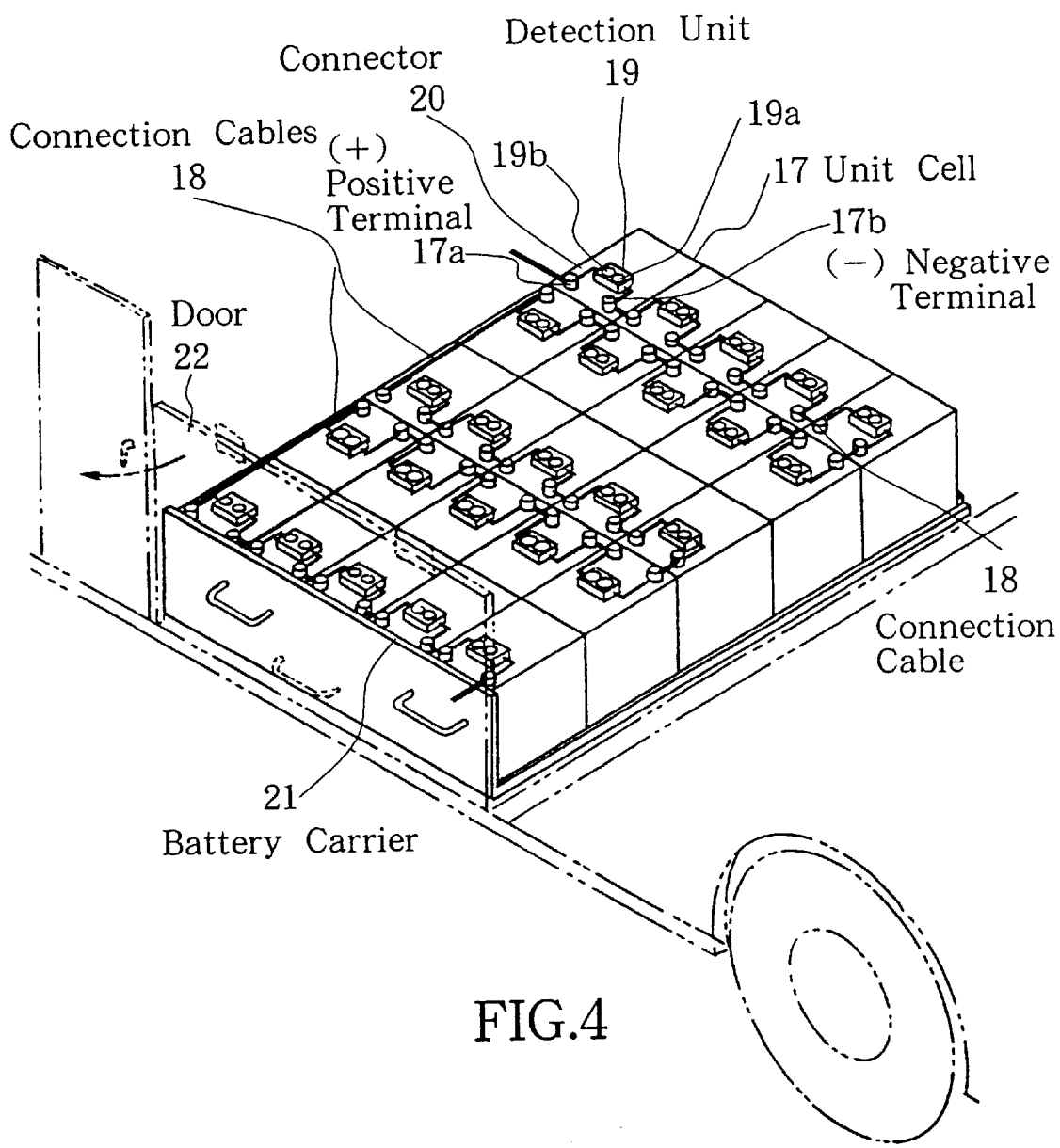
FIG. 4 is a perspective view showing a high-voltage battery comprising unit cells after it has been mounted in an embodiment of the present invention.

FIG. 2 is a block diagram showing the configuration of a high-voltage battery in an embodiment of the present invention. FIG. 3 is a perspective view showing the configuration of a unit cell in an embodiment of the present invention. FIG. 4 is a perspective view showing a high-voltage battery comprising unit cells after it has been mounted in an embodiment of the present invention.

A multiplicity n (in this example, 25) of unit cells 17 are connected in series by connection cables 18, and detection units 19 for detecting if the voltage between positive terminal 17a and negative terminal 17b of a unit cell is less than a preset value are connected by a pair of connectors 20.

As shown in FIG. 4, these n unit cells are housed in battery carrier 21 inside a battery compartment provided low down in the center of the vehicle body, and are screened from the outside by opening and closing door 22.

Detection unit 19 comprises first light-emitting display circuit 19a which emits red light when the voltage between positive terminal 17a and negative terminal 17b is less than a first preset value ($V_1$), as an indication that the unit cell does not satisfy the prescribed amount of charging; and second light-emitting display circuit 19b which indicates by emitting green light when the voltage between positive terminal 17a and negative terminal 17b exceeds a second preset value ($V_2$), as an indication that the unit cell has the prescribed amount of charging.

Figure 5:
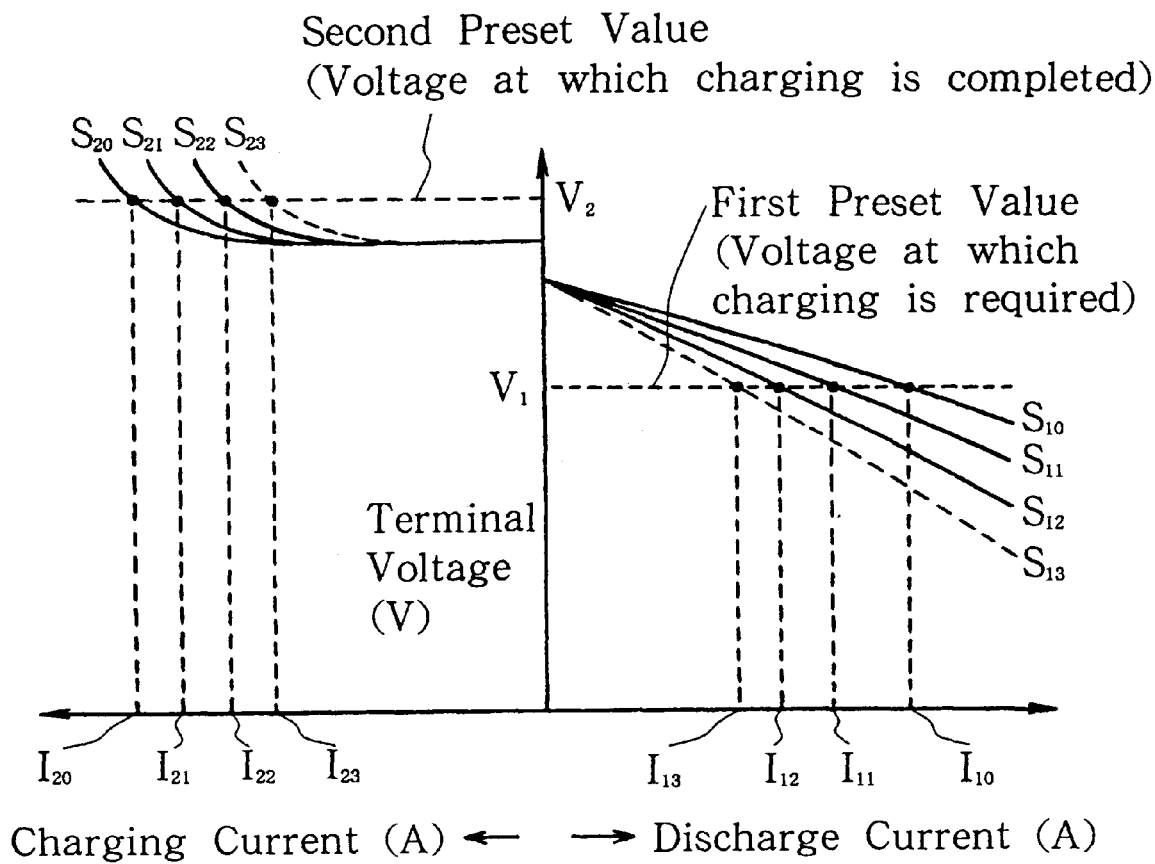
FIG. 5 shows the charging and discharging characteristics of a battery relating to an embodiment of the present invention.

FIG. 5 shows the charging and discharging characteristics of a battery according to an embodiment of the present invention. Battery deterioration can be observed by means of the relation between terminal voltage during use and the discharge current or charging current. In the case of the relation between terminal voltage and discharge current, as shown on the right-hand side of FIG. 5, if the voltage at which charging is required has been set to a first preset value $V_1$ and the battery has not deteriorated, its discharge characteristic will be $S_{10}$, and when the terminal voltage is $V_1$ the discharge current will be $I_{10}$. If the battery deteriorates a little and its characteristic is $S_{11}$, the discharge current will be $I_{11}$ which is smaller than $I_{10}$. When the battery further deteriorates and its characteristic is $S_{12}$, the discharge current will be $I_{12}$ which is smaller than $I_{11}$. If the battery has fully deteriorated its discharge characteristic will be $S_{13}$, and at the same terminal voltage $V_1$ its discharge current will be $I_{13}$, which is smaller than $I_{12}$.

An explanation will now be given of charging characteristics. In the case of the relation between terminal voltage and charging current, if the battery is normal its charging characteristic will be $S_{20}$, and the charging current when the terminal voltage is $V_2$ will be $I_{20}$. If the battery deteriorates a little and its characteristic is $S_{21}$, the charging current when the terminal voltage is $V_2$ will be $I_{21}$, which is smaller than $I_{20}$. When the battery further deteriorates and its characteristic is $S_{22}$, the charging current at the same terminal voltage $V_2$ will be $I_{22}$, which is smaller than $I_{21}$. If the battery has fully deteriorated its charging characteristic will be $S_{23}$ and the charging current when the terminal voltage is $V_2$ will be $I_{23}$, which is smaller than $I_{22}$.

A plurality of such charging and discharging characteristics corresponding to degrees of battery deterioration are stored in advance in memory 7a of program control circuit 7.

Figure 6:
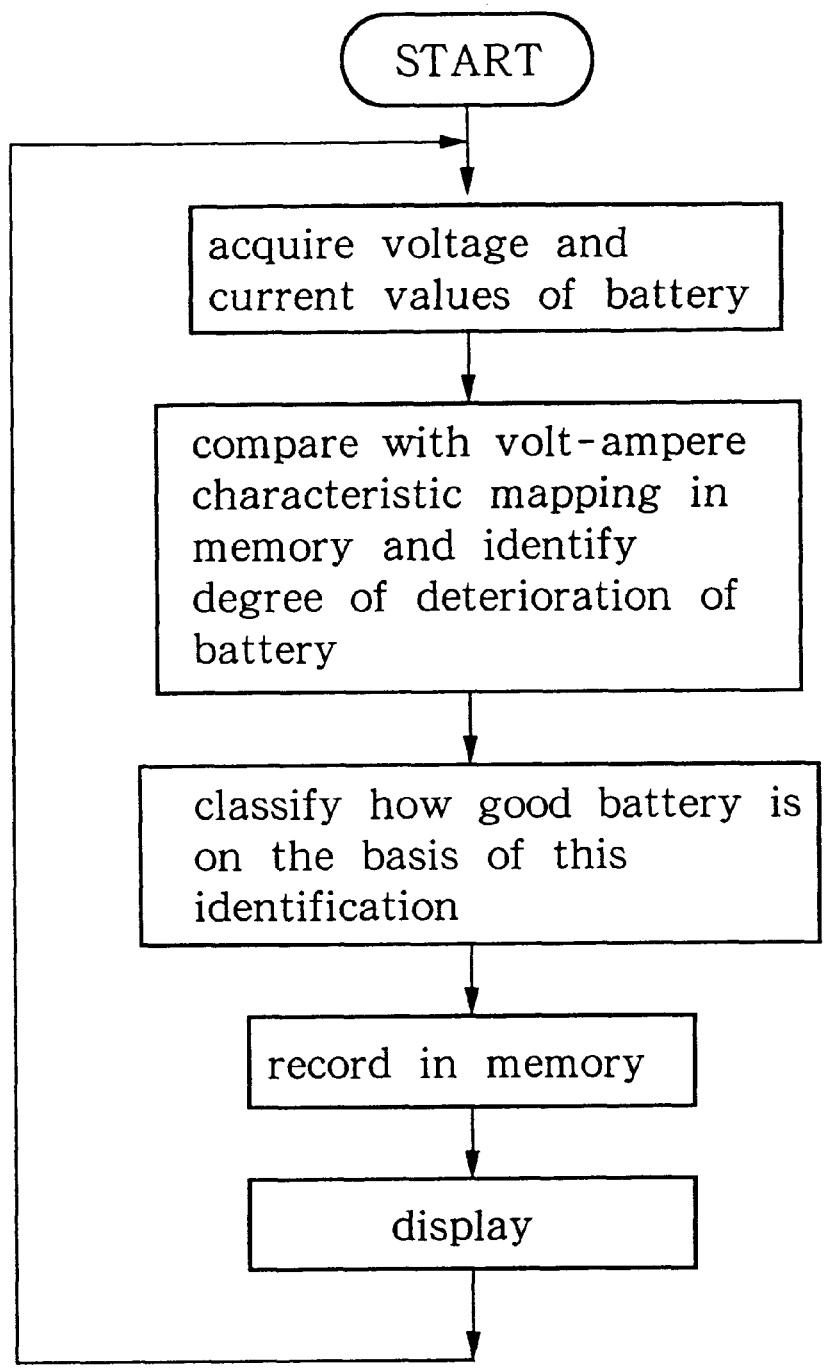
FIG. 6 is a flowchart showing the flow of the identification of battery deterioration in an embodiment of the present invention.
Figure 7:
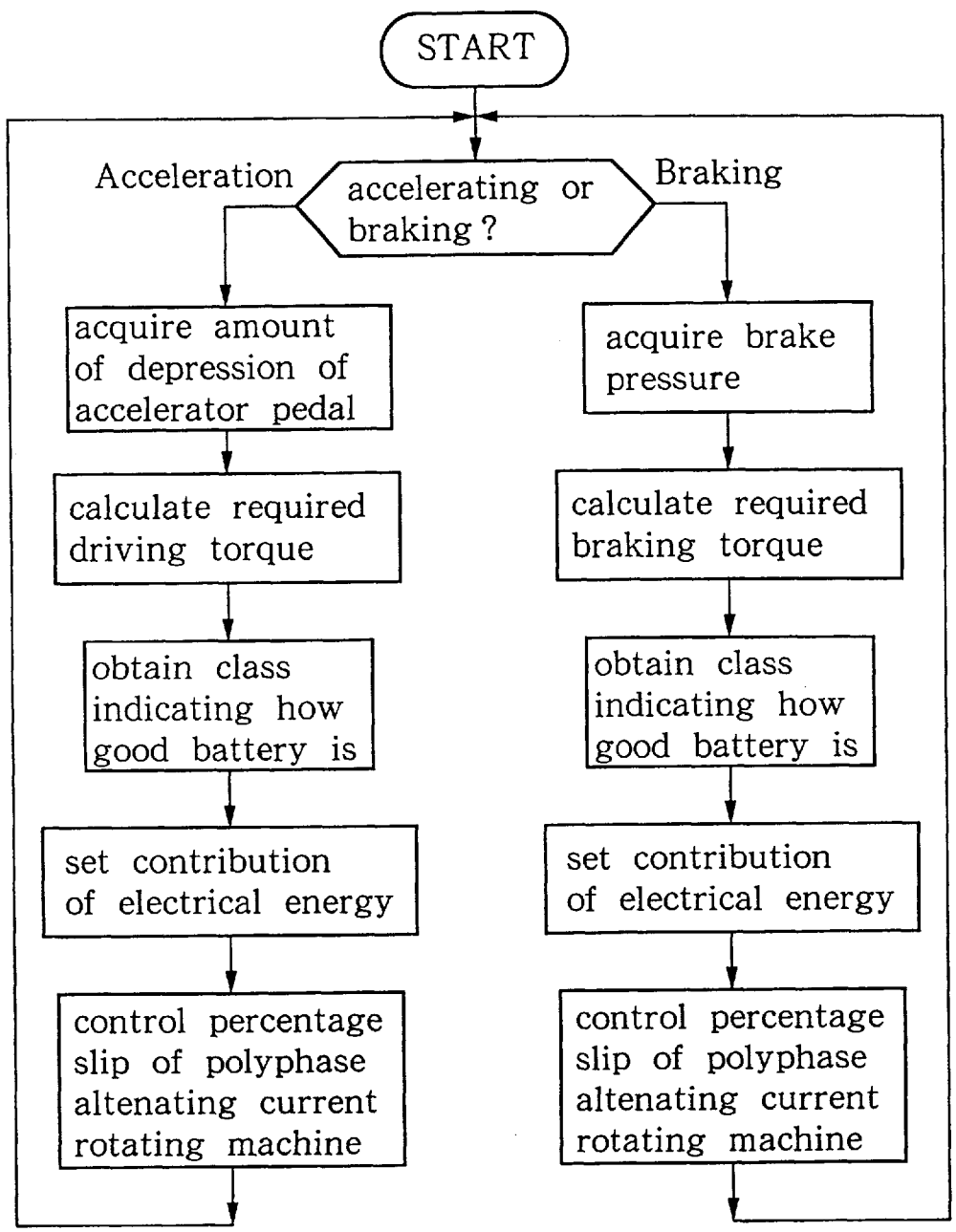
FIG. 7 is a flowchart showing the flow of the charging and discharging current control in an embodiment of the present invention.

An explanation will now be given of the control of charging and discharging currents by the program control circuit in an embodiment of the present invention. FIG. 6 is a flowchart showing the flow of the identification of battery deterioration in an embodiment of the present invention. FIG. 7 is a flowchart showing the flow of the charging and discharging current control in an embodiment of the present invention.

The program control circuit acquires the voltage and current values detected by detection means 14 and current sensor 8, compares these with the volt-ampere characteristic mapping, stored in advance in memory 7a, and identifies the degree of deterioration of battery 3. It classifies how good the state of battery 3 is on the basis of this identification. Namely, it distinguishes to which of the plurality of characteristics $S_{10}$ to $S_{13}$ or $S_{20}$ to $S_{23}$ shown in FIG. 5 the state of battery 3 belongs. It stores the voltage and current values in memory 7a and displays them, graphically and in broad subdivision, on display means 9.

It then decides, from whether the accelerator pedal or the brake pedal has been operated, whether acceleration or braking is intended.

Figure 8:
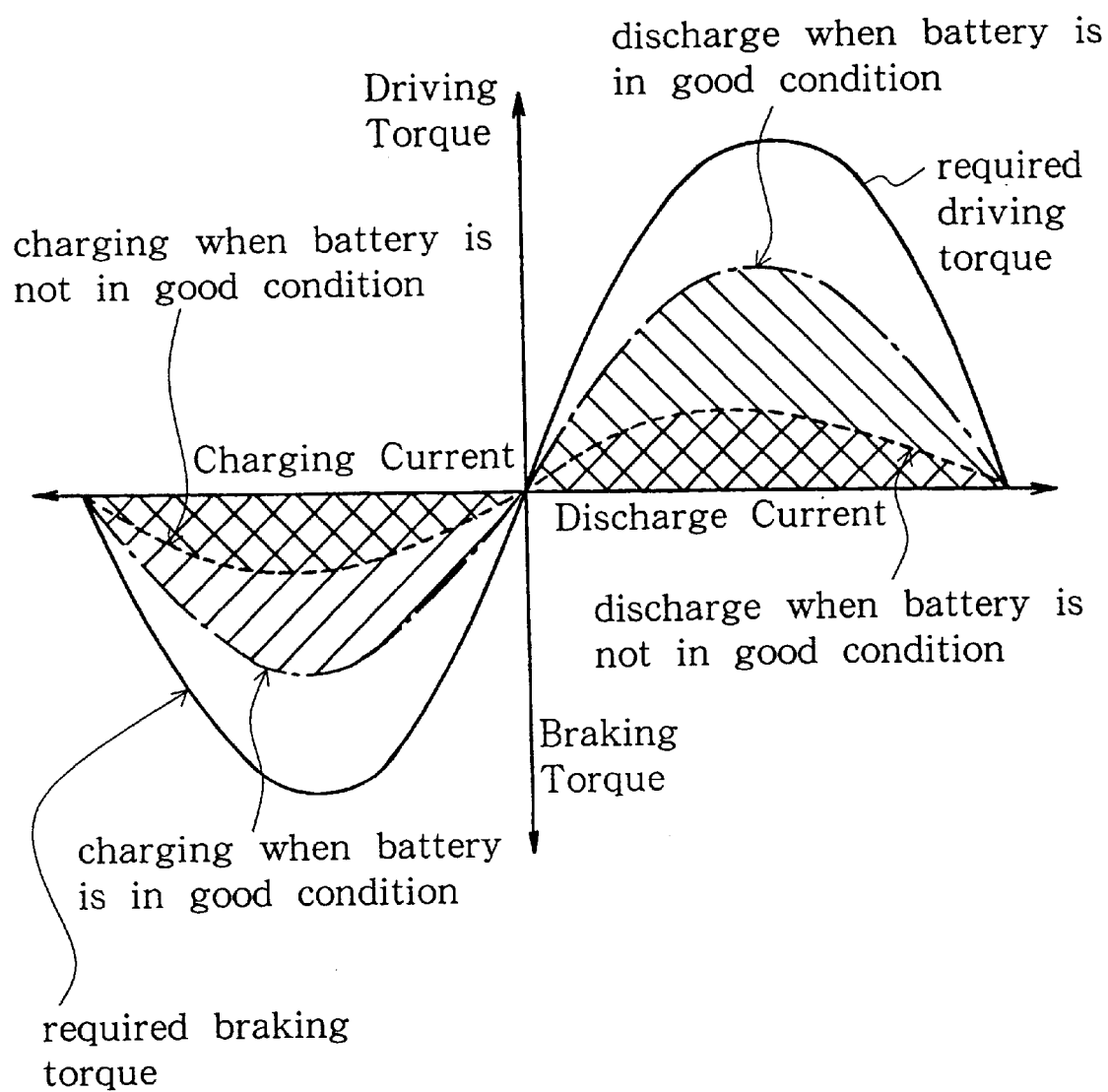
FIG. 8 serves to explain the control states for charging and discharging currents in an embodiment of the present invention.

If acceleration is intended, it acquires the amount of depression of the accelerator pedal from acceleration sensor 10 and calculates the driving torque deemed necessary in correspondence with this amount of depression. It then obtains the class indicative of how good the state of battery 3 is, this class having been recorded previously in memory 7a, and sets the proportion of the required driving torque to be met by electrical energy in accordance with the degree of deterioration of battery 3 indicated by this class. This proportion of required driving torque to be met by electrical energy is set in the following manner. Namely, the percentage slip of polyphase alternating current rotating machine 2 is controlled so that, if battery 3 is in good condition it discharges so as to generate the driving torque indicated for example by the oblique lines shown in the right-hand side of FIG. 8, relative to the required driving torque, and so that if battery 3 is not in good condition it discharges so as to generate the driving torque indicated by the cross-hatching in the same figure.

If braking is intended, it acquires the brake pressure from brake sensor 11 and calculates the braking torque deemed necessary in correspondence with this brake pressure. It then obtains the class indicative of how good the state of battery 3 is, this class having been recorded previously in memory 7a, and sets the proportion of the required braking torque to be met by electrical energy in accordance with the degree of deterioration of battery 3 indicated by this class. This proportion of required braking torque to be met by electrical energy is set in the following manner. Namely, the percentage slip of polyphase alternating current rotating machine 2 is controlled so that, if battery 3 is in good condition it charges so as to generate the braking torque indicated for example by the oblique lines shown in the left-hand side of FIG. 8, relative to the required braking torque, and so that if battery 3 is not in good condition it charges so as to generate the braking torque indicated by the cross-hatching in the same figure.

By performing control of the sort described above, charging or discharging can be controlled in accordance with the degree of battery deterioration so that the battery is not overcharged or over-discharged. Battery life can therefore be lengthened. Even if there is variability in the characteristics of the unit cells, increase of this variability can be prevented and in general the time period for battery replacement can be lengthened.

As has been explained above, according to the present invention it is possible to control the charging and discharging of a battery in accordance with the state of the battery. Namely, control is performed not simply in accordance with whether the battery is poorly charged or well charged, but also according to whether it is new or has deteriorated. As a result, the working life of a battery can be extended. Battery charging and discharging efficiency can also be improved, energy lost by the brakes can be reduced, and as much energy as possible can be regenerated. Even if there is variability in the characteristics of the unit cells, the present invention enables any increase in this variability due to long-term use to be kept small. The present invention is also capable of decreasing battery costs for electric vehicles and of simplifying battery maintenance.

We claim:

1. A control system for a vehicle-mounted battery comprising:
    a polyphase alternating current rotating machine coupled to the driving gear of a vehicle,
    an inverter provided between said polyphase alternating current rotating machine and a battery mounted on the vehicle, said inverter performing AC-to-DC or DC-to-AC conversion,
    a program control circuit for controlling said inverter; and
    measuring means for measuring the current and voltage during at least one of discharging and charging of the battery;
    wherein the program control circuit comprises means for controlling, via the inverter and on the basis of the voltage and current information measured by the aforesaid measuring means, at least one of the charging and discharging current of the battery, and
    wherein the program control circuit comprises a memory in which at least one of charging and discharge volt-ampere characteristics has been stored in advance as a mapping in correspondence with the degree of battery deterioration, and
    identifying means which identifies the degree of battery deterioration by comparing at least one of the discharge or charging volt-ampere characteristics measured by the measuring means with the mapping stored in the memory.

2. A control system for a vehicle-mounted battery according to claim 1, wherein the program control circuit comprises means which acquires the amount of depression of the accelerator pedal and adjusts the magnitude of the discharge current in accordance with the degree of deterioration identified by the aforesaid identifying means, said discharge current serving to generate a driving torque corresponding to the amount of depression of the accelerator pedal.

3. A control system for a vehicle-mounted battery according to claim 1, wherein the program control circuit comprises means which acquires the brake pressure and adjusts the magnitude of the charging current in accordance with the degree of deterioration identified by the aforesaid identifying means, said charging current serving to generate a regenerative braking torque corresponding to the brake pressure.

* * * * *